US 6,662,878 B2

(12) United States Patent
Kreissle et al.

(10) Patent No.: US 6,662,878 B2
(45) Date of Patent: Dec. 16, 2003

(54) TRANSMISSION FOR TRIMMER/MOWER

(75) Inventors: Stephen O. Kreissle, Grand Isle, VT (US); Ned Van Woert, Shelburne, VT (US); Paul McMahon, Hinesburg, VT (US)

(73) Assignee: Country Home Products, Inc., Vergennes, VT (US)

( * ) Notice: Subject to any disclaimer, the term of this patent is extended or adjusted under 35 U.S.C. 154(b) by 84 days.

(21) Appl. No.: 09/950,584

(22) Filed: Sep. 13, 2001

(65) Prior Publication Data

US 2002/0032966 A1 Mar. 21, 2002

Related U.S. Application Data

(60) Provisional application No. 60/230,913, filed on Sep. 13, 2000.

(51) Int. Cl.[7] ............................ A01D 34/64; A01B 33/00
(52) U.S. Cl. ............................ 172/14; 56/12.7; 56/14.7
(58) Field of Search .................... 172/14, 15, 16, 172/17, 42; 56/12.7, 14.7; 30/276

(56) References Cited

U.S. PATENT DOCUMENTS

| | | | | |
|---|---|---|---|---|
| 3,603,162 A | * | 9/1971 | Gohler | .......................... 74/16 |
| 4,286,675 A | * | 9/1981 | Tuggle | ........................ 173/213 |
| 4,760,646 A | | 8/1988 | Siegler | |
| 5,653,028 A | | 8/1997 | Hashimoto | |
| 5,826,414 A | | 10/1998 | Lenczuk | |
| 5,873,287 A | * | 2/1999 | Kawada | .................... 74/606 R |
| 6,182,367 B1 | | 2/2001 | Janczak | |

* cited by examiner

*Primary Examiner*—Robert E. Pezzuto
(74) *Attorney, Agent, or Firm*—Mattingly, Stanger & Malur, P.C.

(57) ABSTRACT

A transmission for a trimmer/mower can be easily mounted onto a bearing housing of a trimmer/mower. The trimmer/mower has a vertically extending drive shaft and the transmission has a worm gear drive assembly that is drivingly connected to the drive shaft to provide an output shaft extending substantially horizontally. The worm gear drive assembly enables speed reduction and torque conversion that increases the speed of rotation and torque of the output shaft as compared with that of the input shaft. Attachments to be used on the trimmer/mower that operate in a substantially vertical plane can be mounted on the output shaft. Further, existing trimmer/mower can be retrofit with a bearing housing to which the transmission can be quickly and easily mounted. The mounting of the transmission onto the bearing housing can be accomplished without the need for tools by providing a twist-on mounting arrangement with a rotation prevention lock having a simple construction.

18 Claims, 11 Drawing Sheets

PRIOR ART

TRANSMISSION FOR TRIMMER/MOWER

This application claims benefit of provisional Application Ser. No. 60/230,913, filed Sep. 13, 2000.

FIELD OF THE INVENTION

The invention relates to a transmission for a trimmer/mower, a trimmer/mower having a transmission and in particular to a transmission for a trimmer/mower that is readily mountable to the trimmer/mower.

BACKGROUND OF THE INVENTION

Conventional trimmer/mowers have a trimmer/mower head that is driven by a vertically extending shaft driven in rotation by an electric motor or internal combustion engine. For cutting grasses and other thin stemmed vegetation, a line trimmer head having monofilament line extending from the periphery of the head is typically used. For cutting larger diameter stalks, including brush and small trees, disc-shaped blade attachments are known to be used. By using such attachments, the trimmer/mower can be used for more than one purpose. However, the vertical orientation of the driven shaft of the trimmer/mower limits the range of attachments that can be used in place of, or in addition to, the rotating trimmer head.

For attachments that perform work in a vertical plane, a horizontally extending driven shaft is required. However, horizontally extending drive shafts are not suitable for use with a trimmer head that cuts vegetation generally parallel to the ground surface, which is the trimmer/mower's primary function. Accordingly, trimmer/mowers of the prior art have limited versatility and are not able to support the use of attachments that perform work in a vertical plane (rotating about a horizontal axis) with respect to the ground.

SUMMARY OF THE INVENTION

It is an object of the present invention to use a transmission with a trimmer/mower that drivingly connects to a drive shaft of a trimmer mower and that has an output drive shaft driven for rotation generally horizontally with respect to the ground surface.

It is a further object of the invention to readily mount and dismount such a transmission from a trimmer/mower, preferably without the need for tools using a simple, quick mounting procedure.

It is yet a further object of the invention to be able to readily mount and dismount such a transmission to a trimmer/mower that is provided with or retrofit with a bearing housing to which the transmission is to be mounted.

According to a preferred embodiment of the invention, a suitable transmission is a worm-gear drive transmission that mounts on the bearing housing of a trimmer/mower and drivingly engages the vertically oriented shaft that is driven by the trimmer/mower. Further, preferably the worm gear drive has an output shaft that is horizontally oriented and rotates at a reduced speed and higher torque with respect to the vertically oriented shaft.

DETAILED DESCRIPTION OF THE PREFERRED EMBODIMENT

Figure 1:
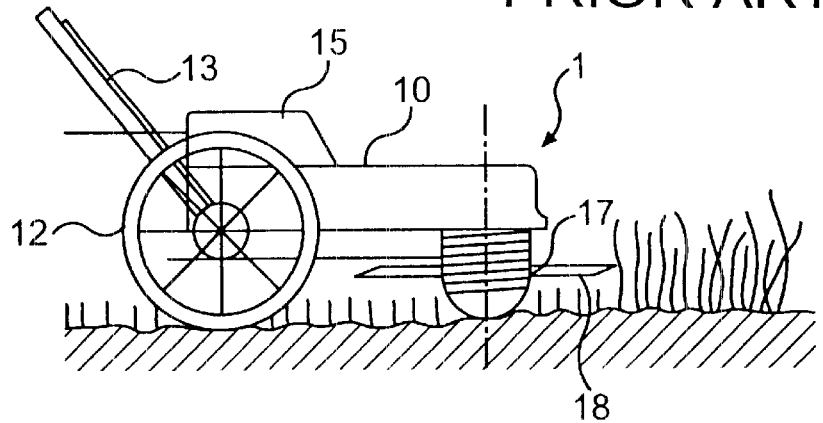
FIG. 1 is a side view of a conventional trimmer/mower according to the prior art.

As shown in FIG. 1, a conventional trimmer/mower 1 has a chassis or body 10 supported by ground engaging wheels 12 and maneuvered by a handle 13. An internal combustion engine or electric motor 15 (shown schematically in FIG. 1) drives a trimmer head 17. As shown, the trimmer head has monofilament cords 18 that rotate to cut vegetation generally parallel to the ground on which the trimmer is supported.

Figure 2:
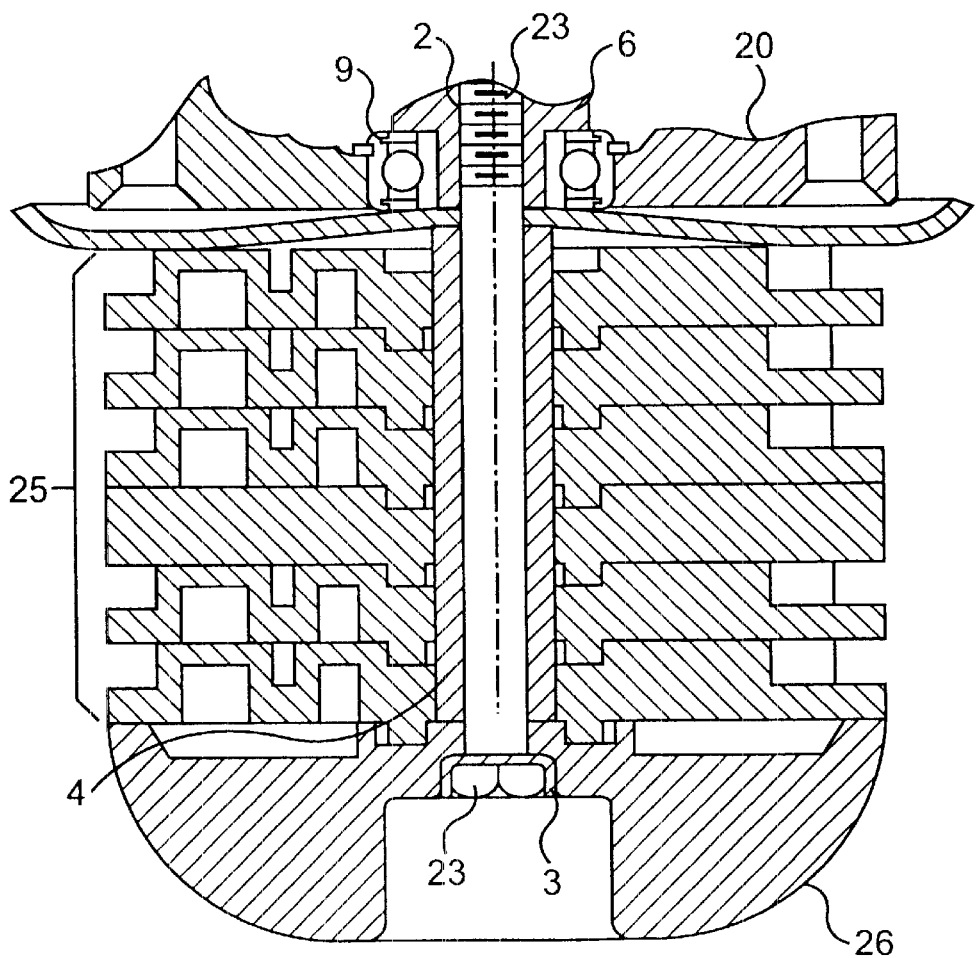
FIG. 2 is a detailed, partial side view of a mounting arrangement of a trimmer head.

As shown in FIG. 2, the trimmer has a bearing housing 20. Trimmer head 17 is a stack of plates 25 with a dome-shaped bottom plate 26 that interfits with the stack of plates and engages the ground during cutting. The monofilament cutting cords can be secured to any of plates 25 in order to establish the preferred cutting height. The stack of plates is fastened together using a threaded fastener, such as cap screw 23 that passes through a sleeve 4 that is fit within aligned center holes of the plates. The cap screw 23 has a square or hexagonal head seated within a recess 3 of the ground engaging bottom plate and is threaded into a tapped or threaded hole 2 in shaft 6. Shaft 6 is a drive shaft that is driven in rotation through a pulley, for example, by the trimmer/mower's engine or motor 15 and is supported in rotation by ball bearing 9. Tightening of screw 23 draws back-up plate 22 into engagement with the inner ring of bearing 9 and/or shaft 6 to ensure rotation of trimmer head 17 with shaft 6.

As shown in FIGS. 1 and 2, a conventional trimmer motor has a vertically oriented drive shaft 6 for driving a cutting implement in a substantially horizontal plane. Although the conventional trimmer/mower 1 is primarily used with a trimmer head 17 having cutting cords for cutting vegetation, the trimmer head can be replaced by a circular blade and therefore used to cut vegetation having a thickness of up to 5 inches in diameter. However, the conventional trimmer/mower is not designed to be used with a wide variety of attachments, especially ones that work in a vertical plane, such as border edgers, lawn dethatchers, and garden cultivators, for example.

Figure 3:
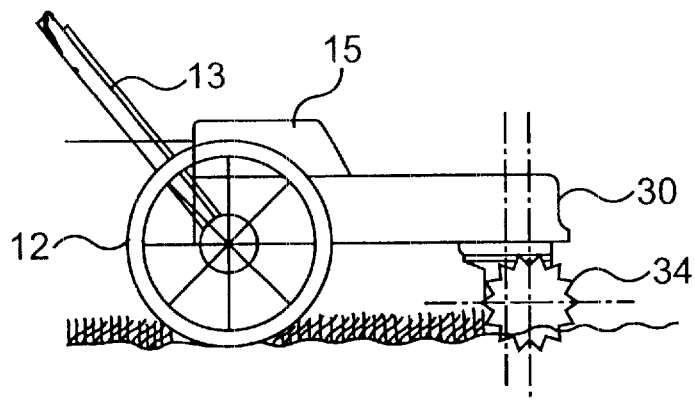
FIG. 3 is a side view of a conventional trimmer/mower having a transmission mounted to drivingly engage the vertically oriented shaft of the trimmer/mower.

According to the present invention, as shown in FIG. 3, a trimmer/mower 30 of the present invention has the versatility to power a trimmer head with a shaft oriented vertically and also has a transmission 32 that is mountable to the bearing housing having an output shaft that is substantially horizontally oriented or transverse to the vertically oriented drive shaft. This arrangement can drive attachments that perform work in a vertical plane, such as the edger attachment 34 that is shown in the FIGURE.

Figure 4:
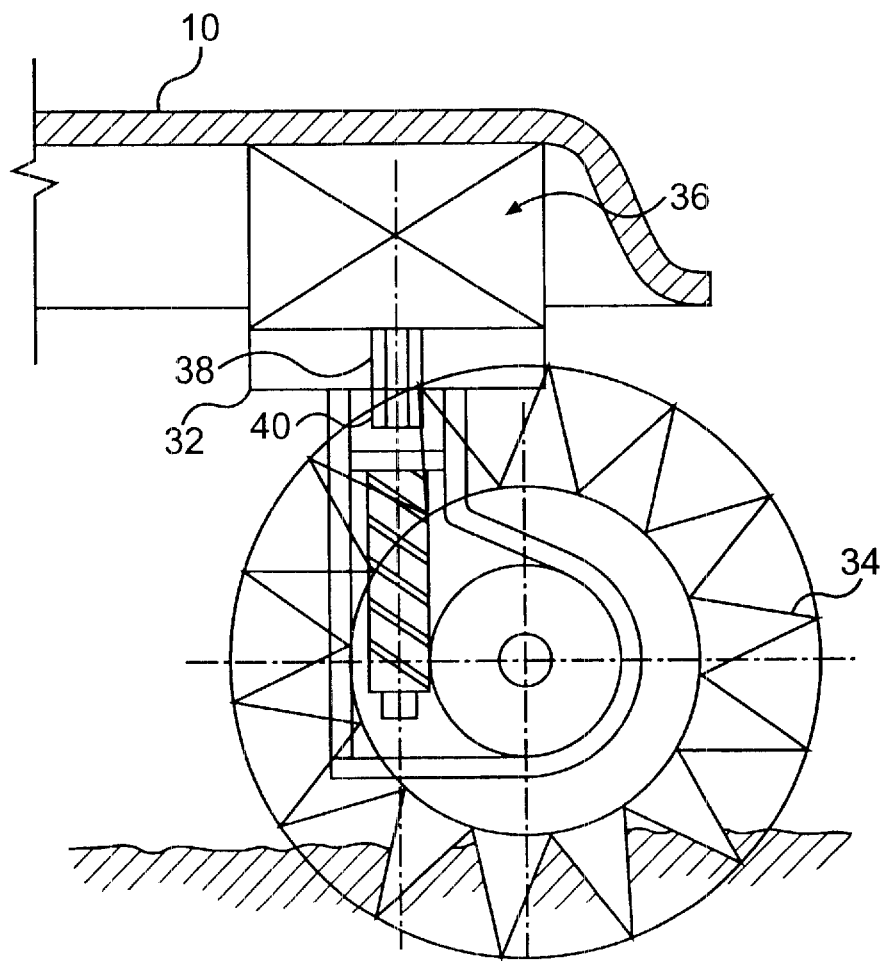
FIG. 4 is a detailed, partial side view of an edger attachment for a trimmer/mower on which is mounted the transmission of the present invention.
Figure 5:
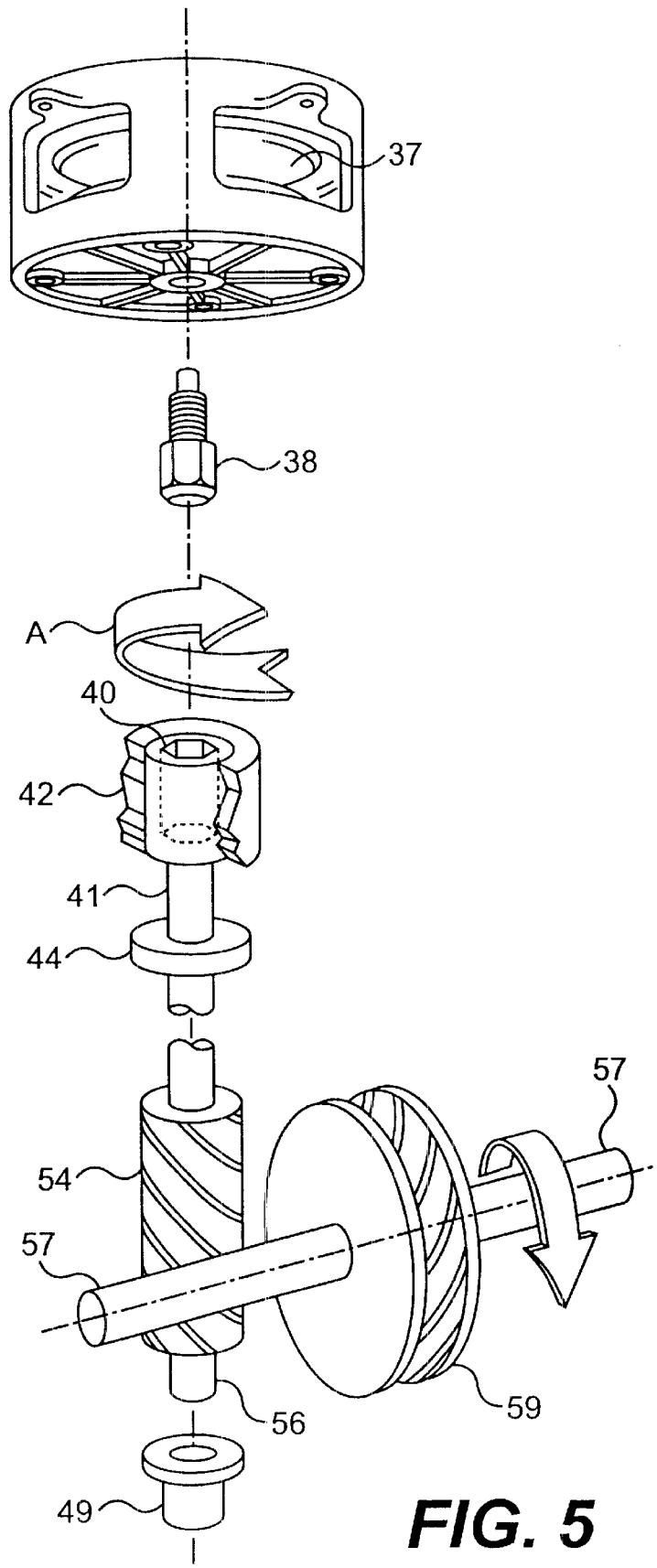
FIG. 5 is a projection view of a worm gear drive assembly which is a preferred embodiment of the transmission for a trimmer/mower according to the present invention.
Figure 6:
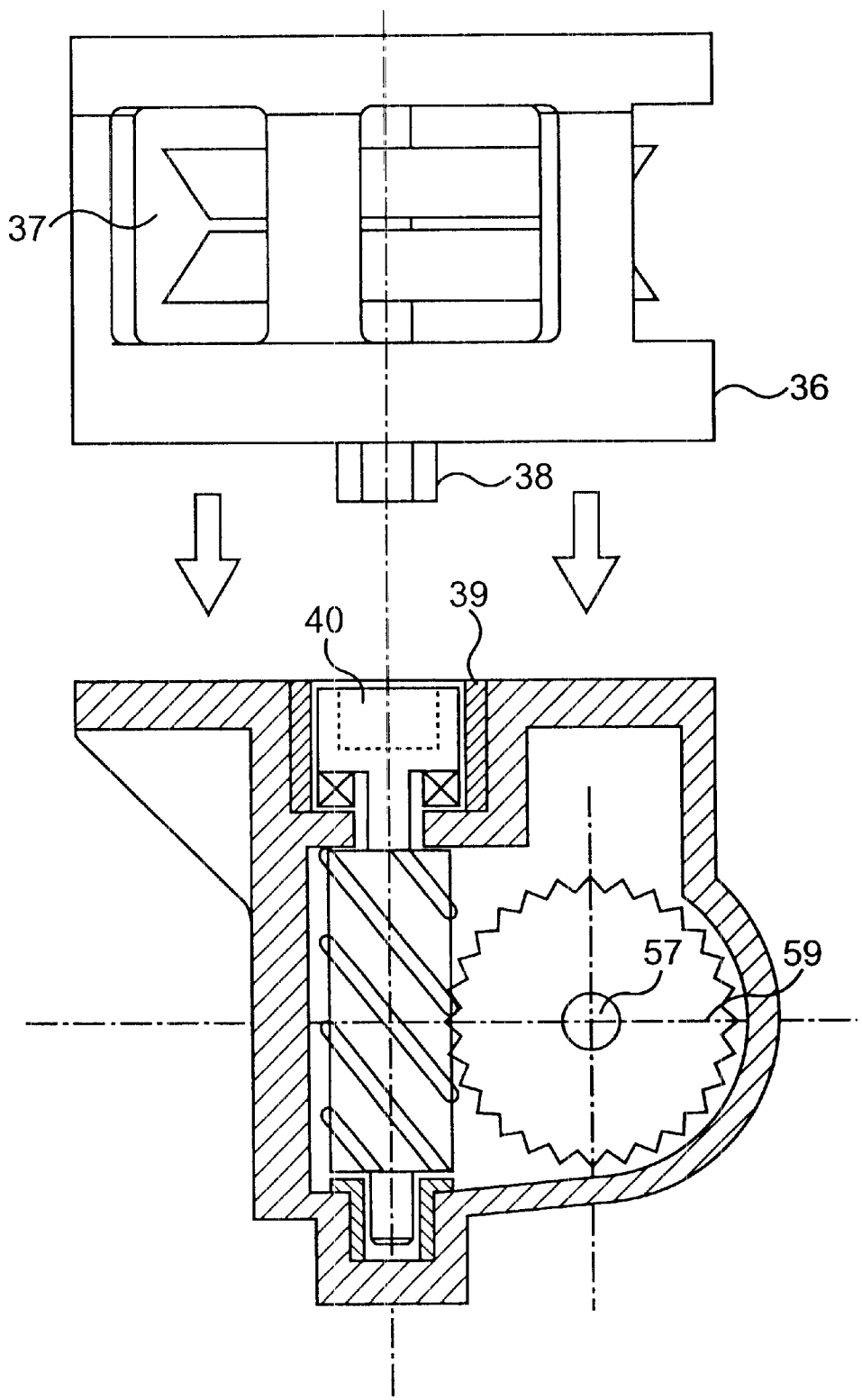
FIG. 6 is a plan view of a bearing housing of a trimmer/mower and a transmission having a worm gear drive assembly according to the preferred embodiment of the present invention as shown in FIG. 5.
Figure 7:
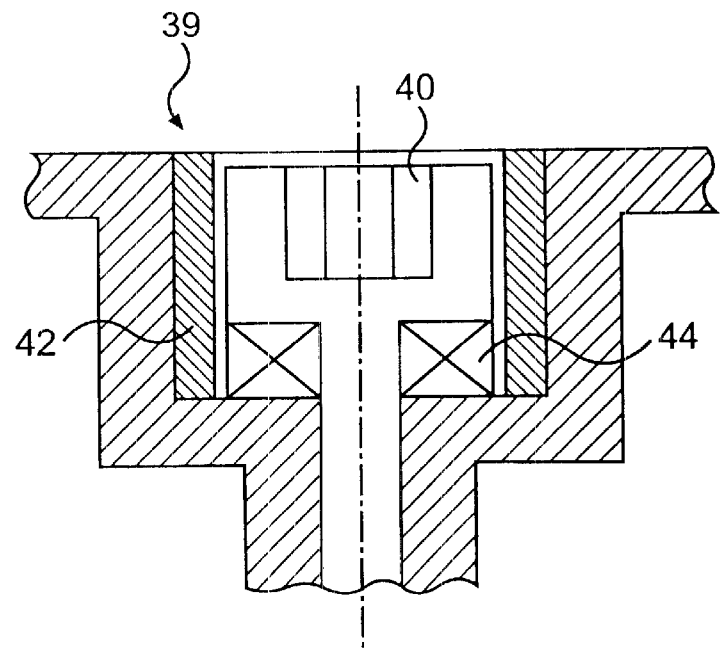
FIG. 7 is a partial sectional view of an upper journal bearing for the shaft on which the worm gear shown in FIG. 6 is mounted.
Figure 8:
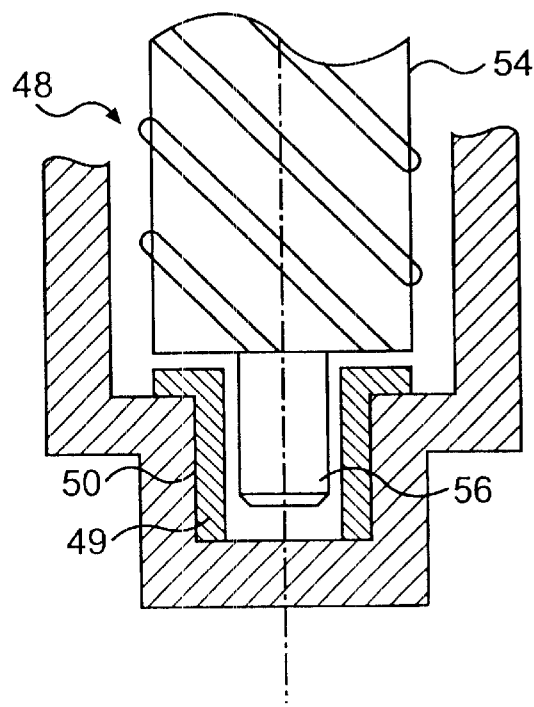
FIG. 8 is a partial sectional view of a lower journal bearing for the shaft on which the worm gear shown in FIG. 6 is mounted.

As shown in detail in FIGS. 4–6, the bearing housing 36 is comparable to the bearing housing of a conventional trimmer/mower, however, the bearing housing of the present invention has a vertically extending shaft 38 to which the transmission 32 is drivingly engaged through a mounting arrangement explained in greater detail with respect to FIGS. 9–19. A horizontal output shaft 57 of transmission 32 is suitable for driving attachments that perform work in a substantially vertical plane, such as an edger.

In FIGS. 5 and 6, a preferred worm gear drive assembly for the transmission 32 is shown. In particular, vertical shaft 38 is shown as a hex shaft adapter that is threaded into the threaded hole of a vertical shaft (e.g. 6 in FIG. 2) which is part of bearing housing 36. An existing trimmer/mower can be retrofitted to include the bearing housing 36 having such a threaded hole in the end of the drive shaft. However, many existing trimmers have a threaded hole (2, FIG. 2) in the vertically extending drive shaft that is driven in rotation by a v-belt and pulley arrangement 37 in a conventional manner.

Within a transmission casing 52, as shown, is a worm gear drive including a shaft 41 having a worm 54 and a gear or wheel 59. Shaft 41 is journalled for rotation at end 56 in a lower journal bearing 48 having a bushing 49 seated within a bore 51 of the transmission casing 52.

Figure 9:
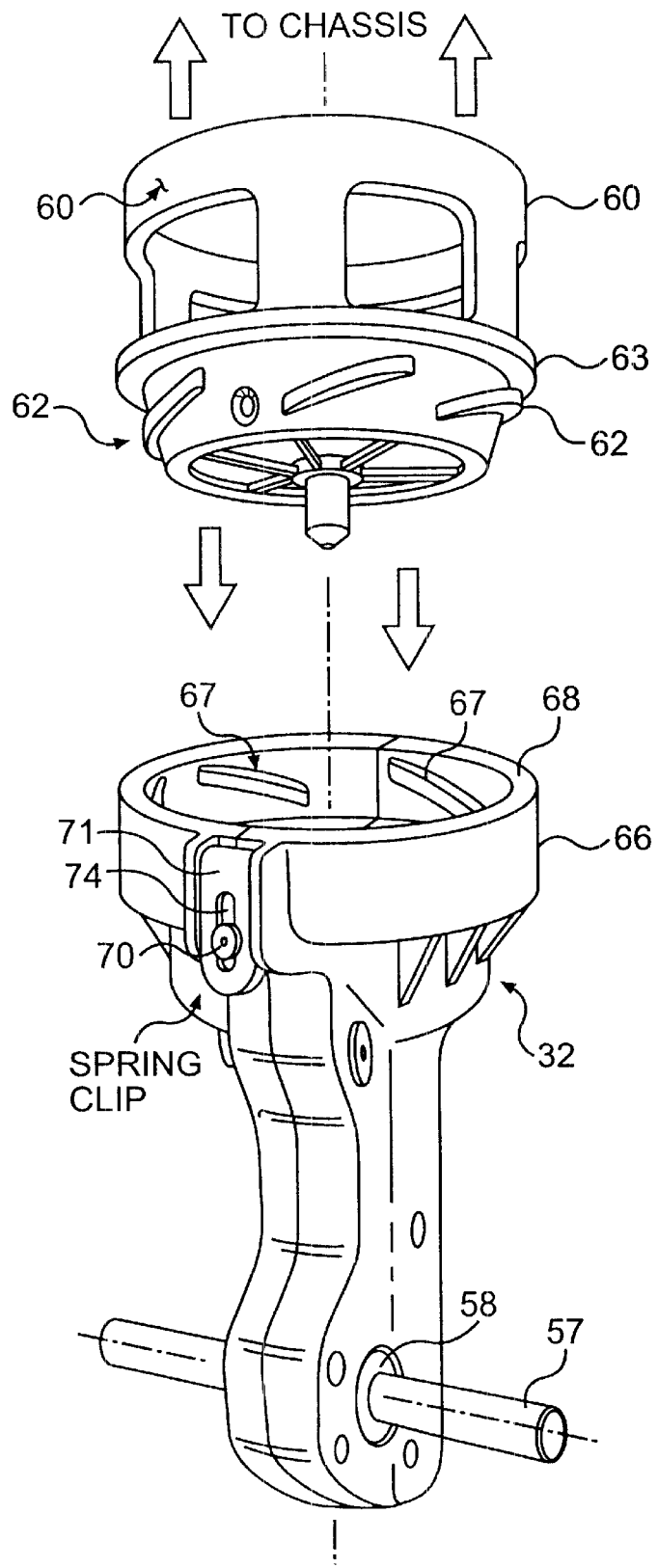
FIG. 9 is a perspective view of the transmission of the present invention and a bearing housing to which the transmission is mounted according to a first embodiment of a mounting arrangement of the present invention.
Figure 10:
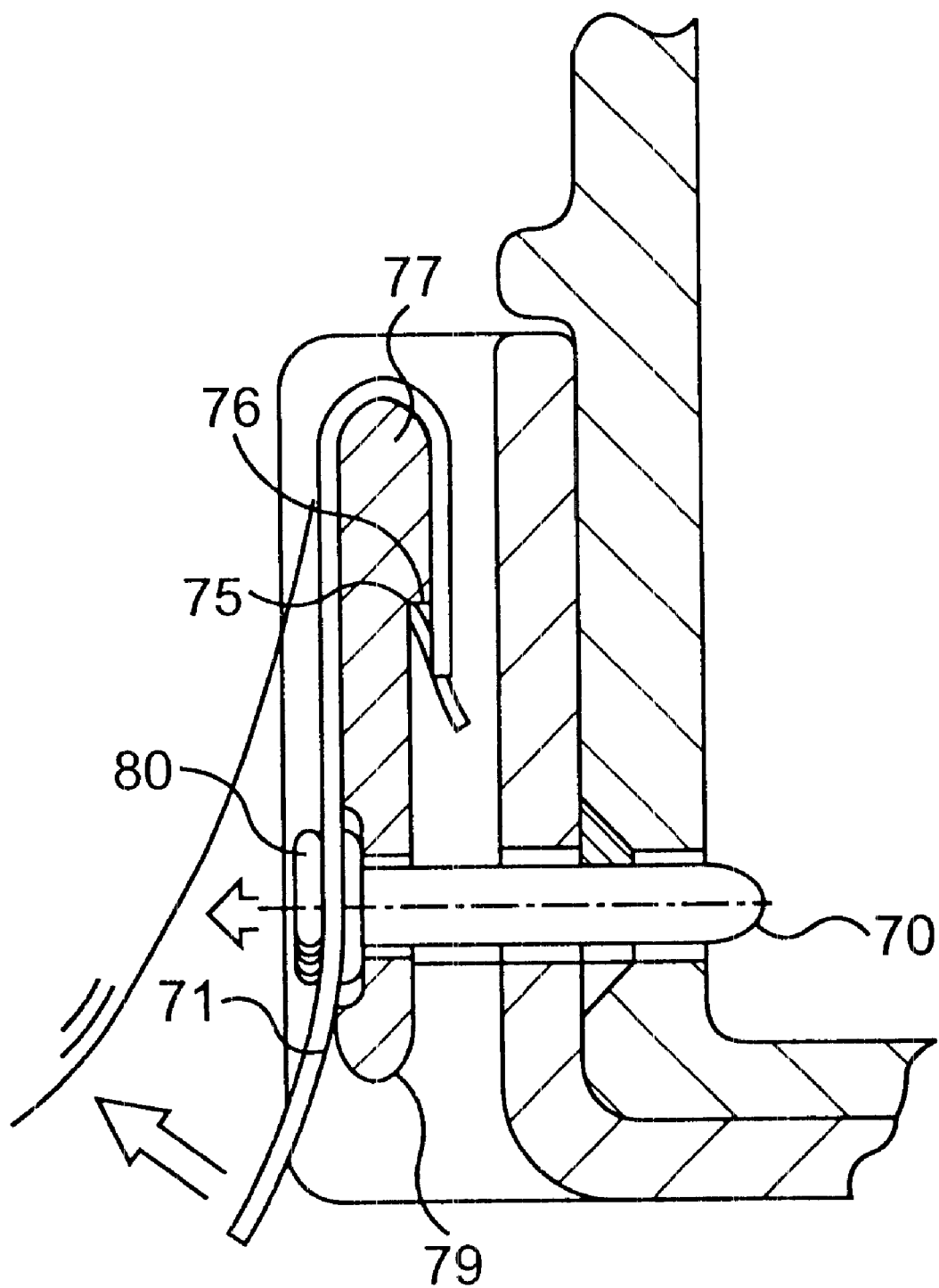
FIG. 10 is a detailed view of the registry pin and spring clip shown in FIG. 9.

A horizontally oriented output shaft 57 is journalled for rotation at its opposite ends by journal bearing 58 (only one of which is shown in FIG. 9) and is driven by a gear 59 having teeth that envelop the worm thread of worm 54. By use of the worm gear drive, it is possible to obtain speed reduction and torque increase of the driven axle 57 with respect to the input shaft 38. Preferably, the speed reduction ratio is about 30:1.

In accordance with one of the objects of the present invention, the transmission is quickly and easily mounted on the bearing housing and the bearing housing which is adapted for the mounting of the transmission is able to be mounted on the trimmer/mower. This enables the user to change from using an attachment, such as a trimmer head that has cutting cord for cutting vegetation to one of various implements that perform work in a substantially vertical plane, such as an edger or garden cultivator.

FIG. 9 shows a first embodiment of a mounting arrangement between a bearing housing 60 (with the trimmer head removed) having a vertically extending hex shaft 38 that is engaged by the hex socket 40 of a worm gear drive assembly as shown in FIGS. 5 and 6. The casing 66 of the transmission 32 constructed according to the present embodiment of the invention has internal threads 67 that are adapted to engage external thread 62 of the bearing housing 60. The hex shaft 38 preferably has a length that is sufficient to enable engagement of hex shaft 38 in hex socket 40 prior to engagement of the threads 62 and 67 so as to ensure a smooth mounting of the transmission 32 to the bearing housing 60. For mounting, transmission 32 is rotated relative to the bearing housing 60 to pull the rim 68 of housing 66 up against a flange 63 of the bearing housing 60. This securely mounts the transmission 32 onto the bearing housing 60 without the need for tools. To prevent reverse rotation or unintentional dismounting of the transmission 32 from the bearing housing 60, a pin 70 that is retained in place by a clip 71 passes through aligned holes 72 and 73 respectively in the casing 66 of the transmission 32 and of the bearing housing 60. Spring clip 71 has an engagement tang 75 that is seated in a recess 76 of a flange 77 formed along the periphery of the casing 66 of the transmission 32. Spring clip 71 further has a slot 74 in which the head 80 of the pin 70 is fixed, for example, by a two-part pin arrangement in which one part has a shoulder 79 that works with head 80 so that the pin 70 is retained in slot 74.

Figure 11:
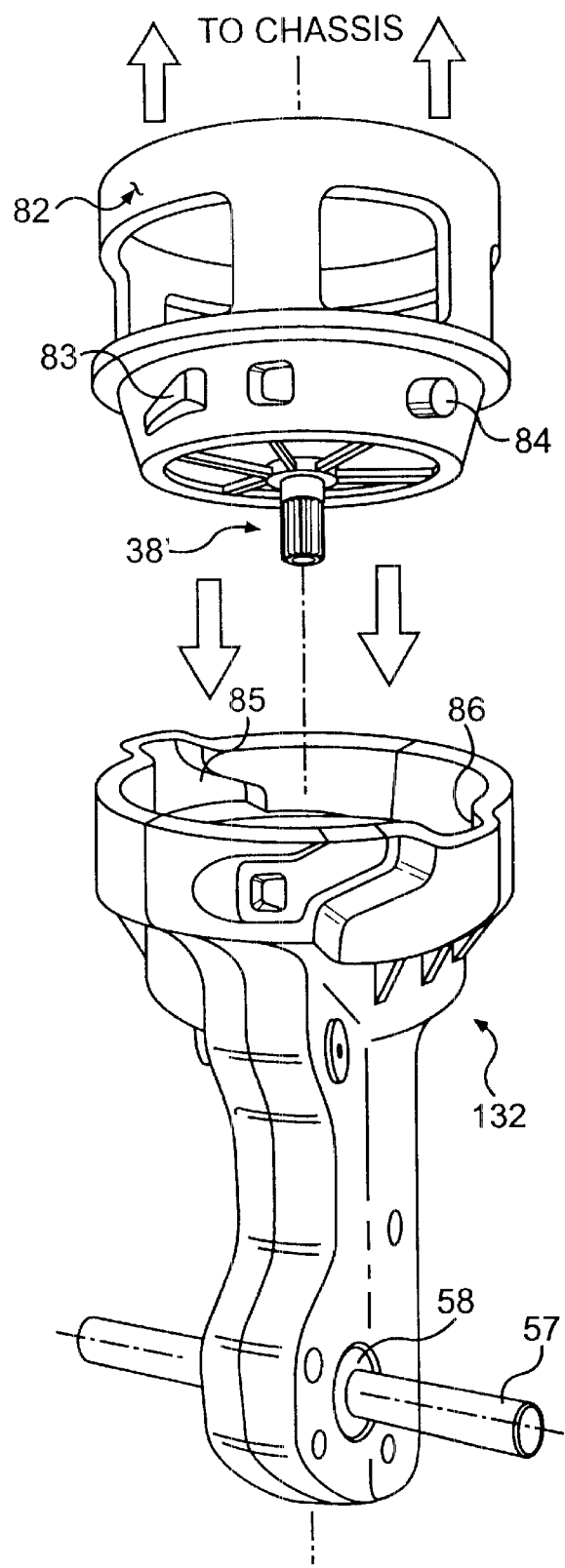
FIG. 11 is a perspective view of the transmission of the present invention and a bearing housing to which the transmission is mounted according to a second embodiment of a mounting arrangement of the present invention.
Figure 12:
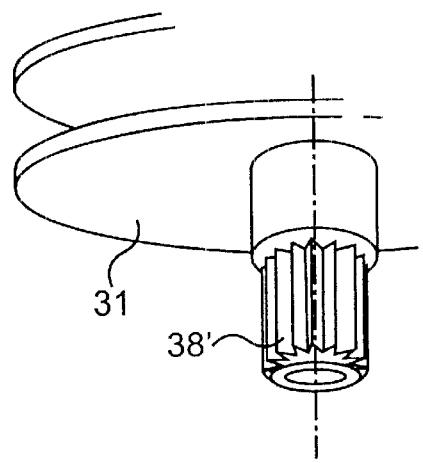
FIG. 12 is a partial isometric view of a pulley and shaft secured to the driven shaft within the bearing housing shown in FIG. 11.
Figure 13:
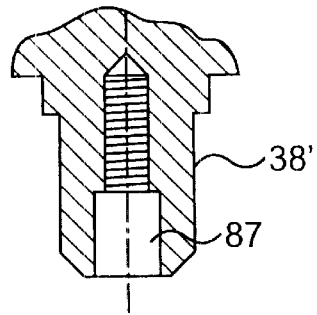
FIG. 13 is a partial sectional view of the pulley and shaft shown in FIG. 12.
Figure 14:
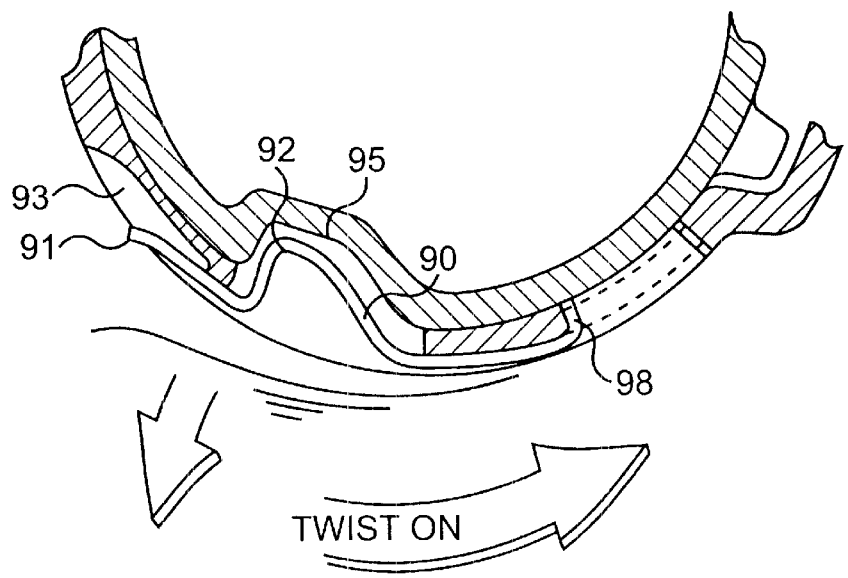
FIG. 14 is a partial sectional view of the spring retention clip shown in FIG. 11.

FIG. 11 shows an alternative arrangement of a bearing housing 82 providing a mounting arrangement of the transmission 32 of the present invention according to a second embodiment thereof. In particular, bearing housing 82 has studs 83 and 84 that respectively engage mating pockets 85 and 86 upon relative rotation of the transmission 32 with respect to the bearing housing 82. As shown in FIGS. 12 and 13, the hex shaft 38' is integral with the pulley 31 in this embodiment. As shown in FIG. 13, the shaft 38' has a threaded bore 87 through which a screw bolt 23 (FIG. 2) can be secured for attaching a trimmer head 17 like that shown in FIG. 1.

To secure against unintentional relative rotation between the transmission 132 and the bearing housing 82, a spring clip 90 is secured along the periphery of the casing 88 of the transmission. One end 91 of the spring clip 90 is positioned to overlay a recess 93 in casing 88 of the transmission so that a user can unseat an engagement portion 94 of the spring clip from being seated within a square through hole 95 of the bearing housing. At its other end, spring clip 90 is secured in a suitable manner, such as by a press fit in a groove.

Figure 15:
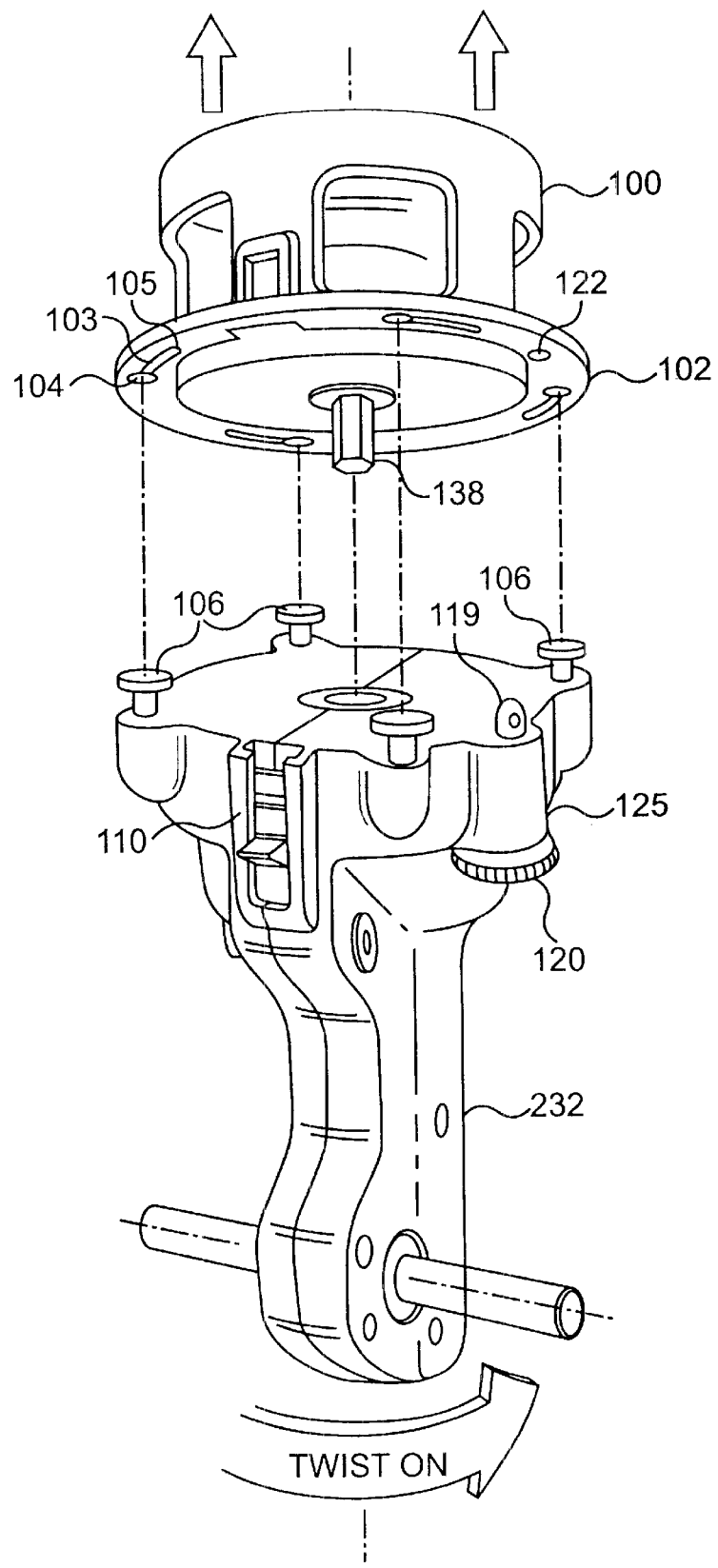
FIG. 15 is a perspective view of the transmission of the present invention and a bearing housing to which the transmission is mounted according to a third embodiment of a mounting arrangement of the present invention.
Figure 16:
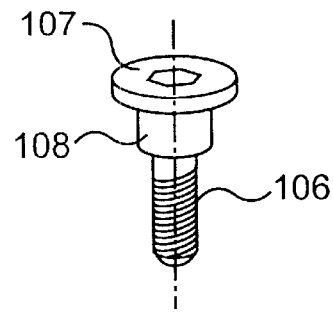
FIG. 16 is an isometric view of a shoulder screw shown in FIG. 15.
Figure 17:
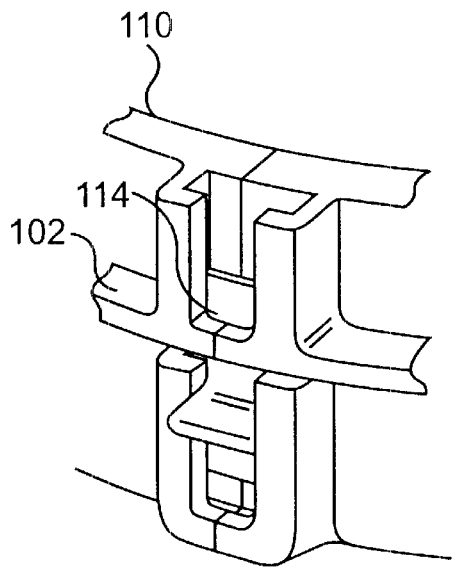
FIG. 17 is a view of a slide latch shown in FIG. 15.

FIGS. 15–19 show a third embodiment of a mounting arrangement of the transmission of the present invention to the bearing housing of a string mower. FIG. 15 shows a bearing housing 100 having a circular bottom flange 102 to which transmission 232 is mounted. Curved slots 103 are provided in flagne 102 and are dimensioned at one end for receiving the head 107 of a shoulder screw 106 (FIG. 16) and dimensioned at the other end 105 to receive the shank 108 of shoulder screw 106 (FIG. 16).

Figure 18:
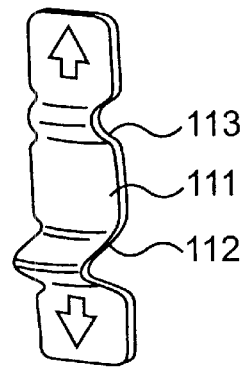
FIG. 18 is an isometric view of the spring steel latch shown in FIG. 17.

To mount transmission 232 onto the circular flange 102 of bearing housing 100, the four shoulder screws are passed through the entry openings 104 of the curved slots 103 and relative rotation engages the shoulder screws within the appropriately dimensioned ends 105 of the slots 103. This insures driving engagement of the hex shaft 138 with the hex socket 140, which respectively have an arrangement similar to that shown in FIG. 5, for example. A lock 110 that prevents relative rotation between the bearing housing 100 and transmission 232 as shown in greater detail in FIGS. 17 and 18. The lock includes a slide latch 111 having a gripping portion 112 and a detent 113 as shown in FIG. 18. That passes underneath a flange 114 with a friction fit to enable the slide latch 111 to be retained in either an upper locked position that locks the transmission unit 232 in place with respect to the bearing housing 100 (as shown) or a lower position in which relative rotation is permitted.

Figure 19:
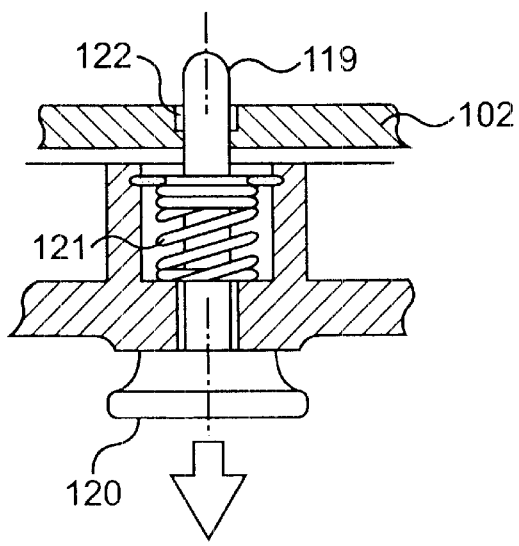
FIG. 19 is a partial sectional view of the plunger lock shown in FIG. 15.

In addition to slide latch lock 110 is a plunger lock 125 shown in detail in FIG. 19. A pin 119 is spring biased by a spring 121 to extend through a hole 122 in a portion of flange 102. A pull knob 120 enables the user to withdraw pin 119 from the hole 122.

According to the present invention, a transmission is quickly and easily mounted on to a bearing housing of a trimmer/mower so that the vertically extending driven shaft of the trimmer/mower is engaged with a worm gear drive assembly of the transmission to provide a driven shaft extending substantially horizontally. Preferably, the worm gear drive assembly enables speed reduction of the vertically driven shaft to permit attachments to be used on the trimmer/mower that operate in a substantially vertical plane and do not need to be driven at such a high rate of speed as that of a string trimmer head. Further, according to the invention, an existing trimmer/mower can be retrofit with the bearing housing of the present invention so that the transmission can be quickly and easily mounted on to the bearing housing. Preferably, the mounting of the transmission on to the bearing housing is accomplished without the need for tools by providing a twist-on mounting arrangement with a rotation prevention lock having a simple construction. In this regard, the hex shaft 38 can be mounted on or otherwise be a part of the transmission. Also, the bottom bearing plate found on some trimmer/mowers needs to be replaced in order to permit the transmission to be mounted and removed in accordance with the teachings of the present invention.

We claim:

1. A transmission mountable to a trimmer/mower having a chassis, a bearing housing mounted to said chassis, a drive shaft mounted for rotation in said bearing housing, and an engine or motor that drives the drive shaft in rotation about a substantially vertically oriented axis of rotation, wherein:

said transmission has an input gear assembly that can engage said drive shaft and an output shaft that is driven in rotation by said input gear assembly about an axis of rotation that is transverse to an axis of rotation of said drive shaft; and said input gear assembly including an input shaft mounted in journal bearings for rotation on which is mounted a worm, said input shaft having a socket for receiving said drive shaft, said transmission having a casing and one of said bearing housing and said casing having external threads, and the other of said bearing housing and said casing having matching internal threads that receive said external threads when said transmission is mounted on said bearing housing; and a device that prevents unintentional dismounting of the transmission from the bearing housing.

2. A transmission according to claim 1, wherein said input gear assembly includes an input shaft journalled for rotation and a worm on said input shaft that is driven in rotation by said drive shaft and wherein said output shaft has a gear having teeth that envelop worm threads of the worm to drive said output shaft in rotation.

3. A transmission according to claim 2, wherein a speed of rotation of said output shaft is reduced by said transmission as compared with a speed of rotation of said input shaft and a torque of said output shaft is increased as compared with that of said input shaft.

4. A transmission according to claim 1, further including an implement mounted on said output shaft of said transmission that performs work in a substantially vertical plane with respect to the ground.

5. A transmission according to claim 1, wherein said output shaft of said transmission is driven about an axis of rotation that is substantially perpendicular to the drive shaft.

6. A transmission according to claim 1, wherein said bearing housing has a threaded hole and said drive shaft is a shaft that is threaded into the threaded hole.

7. A transmission according to claim 1, wherein said device that prevents unintentional dismounting of the transmission from the bearing housing further includes aligned holes in the casing of the transmission and the bearing housing and a pin retained in place by a clip, wherein said pin passes through said aligned holes to prevent reverse unintentional rotation for dismounting of the transmission from the bearing housing.

8. A transmission mountable to a trimmer/mower having a chassis, a bearing housing mounted to said chassis, a drive shaft mounted for rotation in said bearing housing, and an engine or motor that drives the drive shaft in rotation about a substantially vertically oriented axis of rotation, wherein:

said transmission has an input gear assembly that can engage said drive shaft and an output shaft that is driven in rotation by said input gear assembly about an axis of rotation that is transverse to an axis of rotation of said drive shaft;

said input gear assembly including an input shaft mounted in journal bearings for rotation on which is mounted a worm, said input shaft having a socket for receiving said output shaft, said transmission having a casing, one of said bearing housing and said casing having external studs and the other of said bearing housing and said casing having mating pockets and that receive said external studs when said transmission is mounted on said bearing housing; and a device that prevents unintentional dismounting of the transmission from the bearing housing.

9. A transmission according to claim 8, wherein said device that prevents unintentional dismounting further includes the casing having a spring clip secured along a periphery of the casing and the bearing housing having a square through hole, wherein the spring clip is seated within a square through hole of the bearing housing to prevent unintentional dismounting of the transmission from the bearing housing.

10. A trimmer/mower, comprising:

a chassis;

a bearing housing mounted to said chassis;

a drive shaft mounted for rotation in said bearing housing;

an engine or motor that drives the drive shaft in rotation about a substantially vertically oriented axis; and a transmission that is mountable to the bearing housing, having an input gear assembly that engages said shaft and an output shaft that is driven in rotation by engagement with said gear about an axis of rotation that is transverse to the drive shaft;

said input gear assembly including an input shaft mounted in journal bearings for rotation on which is mounted a worm, said input shaft having a socket for receiving said drive shaft, said transmission having a casing and one of said bearing housing and said casing having external threads, and the other of said bearing housing and said casing having matching internal threads that receive said external threads when said transmission is mounted on said bearing housing; and a device that prevents unintentional dismounting of the transmission from the bearing housing.

11. A trimmer/mower according to claim 10, wherein said device that prevents unintentional dismounting includes aligned holes in the casing of the transmission and the bearing housing and a pin that is retained in place by a clip, wherein said pin passes through said aligned holes.

12. A trimmer/mower according to claim 10, wherein said input gear assembly includes an input shaft journalled for rotation and a worm on said input shaft that is driven in rotation by said drive shaft and wherein said output shaft has a gear having teeth that envelop worm threads of the worm to drive said output shaft in rotation.

13. A trimmer/mower according to claim 12, wherein a speed of rotation of said output shaft is reduced by said transmission as compared with a speed of rotation of said input shaft and a torque of said output shaft is increased as compared with that of said input shaft.

14. A trimmer/mower according to claim 10, further including an implement mounted on said output shaft of said transmission that performs work in a substantially vertical plane with respect to the ground.

15. A trimmer/mower according to claim 10, wherein said output shaft of said transmission is driven about an axis of rotation that is substantially perpendicular to the drive shaft.

16. A trimmer/mower according to claim 10, wherein said bearing housing has a threaded hole and said drive shaft is a hex shaft that is threaded into the threaded hole.

17. A trimmer/mower comprising:

a chassis;

a bearing housing mounted to said chassis;

a drive shaft mounted for rotation in said bearing housing;

an engine or motor that drives the drive shaft in rotation about a substantially vertically oriented axis; and a transmission that is mountable to the bearing housing, having an input gear assembly that engages said shaft and an output shaft that is driven in rotation by engagement with said gear about an axis of rotation that is transverse to the drive shaft; and said input gear assembly including an input shaft mounted in journal bearings for rotation on which is mounted a worm, said input shaft having a socket for receiving said output shaft said transmission having a casing and one of said bearing housing and said casing having external studs and the other of said bearing housing and said casing having mating pockets that receive said external studs when said transmission is mounted on said bearing housing; and a device that prevents unintentional dismounting of the transmission from the bearing housing.

18. A trimmer/mower according to claim 17, wherein said device that prevents unintentional dismounting further includes a spring clip secured along a periphery of the casing and the bearing housing having a square through hole, wherein the spring clip is seated within a square through hole of the bearing housing to prevent reverse unintentional rotation for dismounting of the transmission from the bearing housing.

\* \* \* \* \*